(12) United States Patent
Tamei et al.

(10) Patent No.: US 11,448,574 B2
(45) Date of Patent: Sep. 20, 2022

(54) SENSOR DEVICE DETECTING SPECIFIC COMPONENT IN GAS

(71) Applicant: DENSO CORPORATION, Kariya (JP)

(72) Inventors: Yuto Tamei, Kariya (JP); Hirofumi Noda, Kariya (JP); Takehito Kimata, Kariya (JP); Takashi Araki, Kariya (JP)

(73) Assignee: DENSO CORPORATION, Kariya (JP)

( * ) Notice: Subject to any disclaimer, the term of this patent is extended or adjusted under 35 U.S.C. 154(b) by 231 days.

(21) Appl. No.: 16/885,636

(22) Filed: May 28, 2020

(65) Prior Publication Data

US 2020/0292421 A1 Sep. 17, 2020

Related U.S. Application Data

(63) Continuation of application No. PCT/JP2018/043107, filed on Nov. 22, 2018.

(30) Foreign Application Priority Data

Nov. 29, 2017 (JP) .............................. JP2017-229645

(51) Int. Cl.
*G01N 1/22* (2006.01)
*G01D 11/24* (2006.01)
*G01N 15/06* (2006.01)
*G01N 27/04* (2006.01)
*G01N 27/407* (2006.01)

(52) U.S. Cl.
CPC .......... *G01N 1/2252* (2013.01); *G01D 11/245* (2013.01); *G01N 15/0606* (2013.01); *G01N 27/04* (2013.01); *G01N 27/407* (2013.01)

(58) Field of Classification Search
CPC .. G01N 1/2252; G01N 15/0606; G01N 27/04; G01N 27/407; G01N 2015/0046; G01N 15/0656; G01N 27/4077; G01D 11/245
See application file for complete search history.

(56) References Cited

U.S. PATENT DOCUMENTS 6,346,179 B1* 2/2002 Makino .............. G01N 27/4077
204/426
7,413,641 B2* 8/2008 Yamada ............. G01N 27/4077
204/424

(Continued)

FOREIGN PATENT DOCUMENTS

JP 2000-171430 6/2000

*Primary Examiner* — Freddie Kirkland, III
(74) *Attorney, Agent, or Firm* — Nixon & Vanderhye P.C.

(57) ABSTRACT

A sensor device is equipped with a housing having an element cover retaining a sensor element such that a detection section of the sensor element is positioned at the tip end of the sensor element. The element cover includes an inner cover provided with inner side holes and an inner tip face hole respectively provided therein, and an outer cover provided with outer side holes in a side thereof, with the tip position of the outer side holes located closer to the tip end than is the tip position of the inner cover. Between the outer surface of the inner cover and the inner surface of the outer cover there is a large clearance section at the tip end and a small clearance section at the base end, providing a flow path that is shaped for connecting the large clearance section and the small clearance section without a step.

10 Claims, 9 Drawing Sheets

(56) References Cited

U.S. PATENT DOCUMENTS

| | | | | |
|---|---|---|---|---|
| 8,061,183 B2* | 11/2011 | Ebner | ................ | G01N 27/4077 |
| | | | | 73/23.31 |
| 8,479,561 B2* | 7/2013 | Sekiya | ............... | G01N 27/4077 |
| | | | | 73/23.31 |
| 10,634,640 B2* | 4/2020 | Mizutani | ............ | G01N 27/4077 |
| 10,775,357 B2* | 9/2020 | Adachi | ............. | G01N 33/0009 |
| 10,837,878 B2* | 11/2020 | Koike | .................... | G01N 27/04 |
| 10,996,192 B2* | 5/2021 | Araki | ................ | G01N 27/4077 |
| 11,226,321 B2* | 1/2022 | Adachi | ................ | G01N 27/419 |
| 2004/0144645 A1 | 7/2004 | Yamada et al. | | |
| 2005/0016849 A1* | 1/2005 | Ikoma | ................ | G01N 27/4077 |
| | | | | 204/429 |
| 2007/0251823 A1* | 11/2007 | Yamada | ............. | G01N 27/4077 |
| | | | | 204/424 |
| 2008/0016948 A1* | 1/2008 | Yamada | ............. | G01N 27/4077 |
| | | | | 73/31.05 |
| 2009/0101503 A1* | 4/2009 | Kanao | ................. | G01N 27/407 |
| | | | | 29/592.1 |
| 2015/0276654 A1* | 10/2015 | Araki | .................. | G01N 27/403 |
| | | | | 204/431 |
| 2015/0300979 A1* | 10/2015 | Endo | ................. | G01N 27/4077 |
| | | | | 73/114.71 |
| 2016/0076919 A1* | 3/2016 | Murakami | ........... | G01D 11/245 |
| | | | | 73/431 |
| 2016/0153814 A1* | 6/2016 | Seimori | ............ | G01N 33/0054 |
| | | | | 73/431 |
| 2017/0131185 A1 | 5/2017 | Koike et al. | | |
| 2017/0315082 A1 | 11/2017 | Kawamoto et al. | | |
| 2018/0252671 A1 | 9/2018 | Araki et al. | | |
| 2018/0321125 A1 | 11/2018 | Holzknecht et al. | | |

* cited by examiner

SENSOR DEVICE DETECTING SPECIFIC COMPONENT IN GAS

This application is the U.S. bypass application of International Application No. PCT/JP2018/043107 filed Nov. 22, 2018 which designated the U.S. and claims priority to Japanese Patent Application No. 2017-229645, filed Nov. 29, 2017, the contents of which are incorporated herein by reference.

BACKGROUND

Technical Field

The present disclosure relates to a sensor device for detecting a specific component in a gas that is under measurement.

Description of the Related Art

An exhaust gas purification system is known that includes a sensor device for detecting a specific component in exhaust gas and a purification device such as a filter device or a catalyst device, provided in the exhaust gas passage of an internal combustion engine.

SUMMARY

The present disclosure provides a sensor device including a sensor element having a detection section for detecting a specific component in a gas under measurement, a housing having the sensor element inserted into the interior thereof, held with the detection section positioned at the tip end of the sensor element with respect to the axial direction and, an element cover at the tip end of the housing. The element cover includes an inner cover disposed such as to cover the tip end of the sensor element, and an outer cover disposed with a space between it and the outer periphery of the inner cover.

BRIEF DESCRIPTION OF THE DRAWINGS

The above objects and other objects, features and advantages of the present disclosure will be made clearer by the following detailed description, given referring to the appended drawings.

In the accompanying drawings.

DESCRIPTION OF THE PREFERRED EMBODIMENTS

Figure 1:
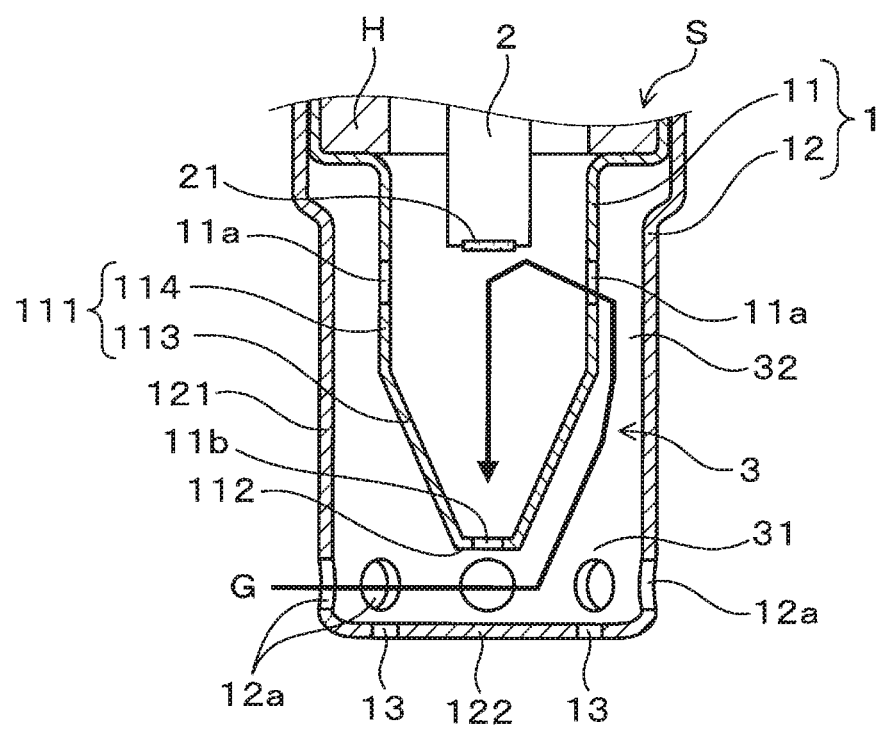
FIG. 1 is an enlarged cross-sectional view of a main part of a PM sensor according to a first embodiment.

According to a conventional sensor device, the sensor device is, for example, a particulate matter sensor which detects particulate matter (referred to in the following as PM when appropriate), and is disposed at a position downstream from a filter device which serves to collect PM, for judging whether filter failure occurs. Furthermore, an exhaust gas sensor such as an oxygen sensor is disposed upstream or downstream from the catalyst device.

Such a sensor device generally includes a sensor element that is seated in a housing, protruding from the housing, and an element cover that surrounds the outer periphery of the sensor element. The sensor element includes a detection section at the tip thereof (the protruding end), which is protected by the element cover, and detects a specific component contained in exhaust gas that is drawn into the element cover. For example, JP 2016-090569 A discloses a configuration in which the element cover is generally configured as a single or double cover.

With the gas sensor described in the above-mentioned patent literature, the element cover is for example a double cover, in which an inner cover is positioned within an outer cover that is attached to the outer periphery of the inner cover, whereby after the exhaust gas has entered a space formed between the two covers through gas flow holes formed in an outer peripheral part of the outer cover, at the base end, and has flowed through that space, the exhaust gas is introduced into the interior of the inner cover through a gas flow hole formed in an intermediate outer peripheral portion of the inner cover, . The tip face of the inner cover is positioned within the gas flow holes formed in the outer cover, and the exhaust gas that has contacted the sensor element flows out to the exterior from a gas flow hole formed in the tip face of the inner cover.

With the conventional element cover configuration described in the above-described patent literature, it has been found that under the operating conditions of an internal combustion engine in which the exhaust gas has a low flow velocity, the gas flow velocity within the element cover becomes decreased, and the detection sensitivity or output response of the sensor element deteriorates. For example, when an internal combustion engine is being started, particulate matter will readily be discharged, and hence it would be desirable to improve the detection sensitivity of the PM sensor in that condition, however, if the gas flow velocity within the element cover is lowered, it becomes difficult for the flow of exhaust gas containing particulate matter to reach the detection section. On the other hand, at the time of engine starting, water condensate that is in the exhaust gas passage can readily enter through the gas flow holes in the tip, and if this adheres to the sensor element, it causes element cracking due to moisture (referred to in the following as water cracking).

With another element cover configuration described in the above patent literature, the tip face of an inner cover that is positioned inside a double cover is disposed separated from the tip face of an outer cover, with the outer cover being positioned outside the inner cover, forming a space between the tip faces of the outer cover and the inner cover, while also the diameter of the inner cover is reduced at the tip end. With that configuration, exhaust gas is introduced from gas flow holes that open in a tip part of the outer periphery of the outer cover, and after flowing through the space between the two tip faces, then passes through a space at the periphery of the reduced diameter portion of the inner cover, towards the gas flow holes at the base end of the inner cover.

With that configuration, the gas flow hole in the tip face of the inner cover does not open directly to the exterior, thereby preventing the sensor element from becoming wet. However, the flow of gas into the space outside the inner cover produces a large eddy current at a stepped surface of the reduced diameter portion, causing the flow velocity to decrease, and it is found that the gas flow toward the inner cover is insufficiently formed, in particular when the flow velocity is low. It thereby becomes difficult for particulate matter to reach the detection section within the inner cover, causing the detection sensitivity of the PM sensor to be lowered, and furthermore the output response of the sensor may be reduced when it is used as an exhaust gas sensor.

With reference to the drawings, embodiments of the present disclosure will be described.

First Embodiment

Figure 2:
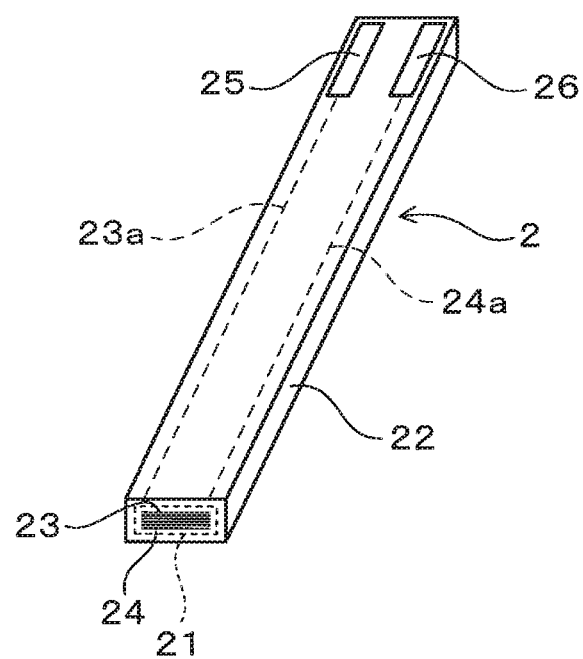
FIG. 2 is an overall perspective view of a sensor element of the PM sensor of the first embodiment.
Figure 3:
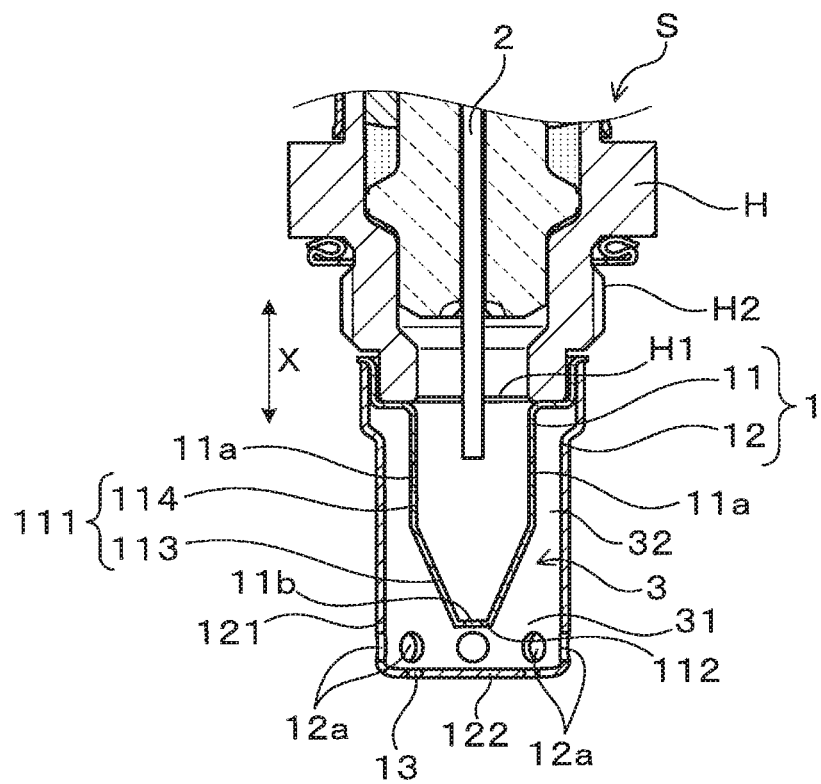
FIG. 3 is a cross-sectional view in the axial direction showing the general configuration of the PM sensor of the first embodiment.

As shown in FIGS. 1 to 3, a sensor device according to the present embodiment is a PM sensor S for detecting particulate matter, and is applied, for example, as an exhaust gas purification device of an internal combustion engine E shown in FIG. 1. In FIG. 1, the PM sensor S includes a sensor element 2 having a detection section 21, a housing H into which the sensor element 2 is inserted, retained therein with the detection section 21 positioned at the tip of the sensor element 2 with respect to the axial direction X, and an element cover 1 disposed at the tip end of the housing H.

The internal combustion engine E is, for example, an automobile diesel engine or a gasoline engine, and the detection section 21 of the sensor element 2 detects particulate matter that is a specific component contained in the exhaust gas, which is the gas to be measured. The axial direction X of the PM sensor S is shown as the vertical direction in FIGS. 3 and 4, with the tip end as the lower end and the base end as the upper end In FIG. 1, the element cover 1 has an inner cover 11 disposed coaxial with the PM sensor S such as to cover the tip end of the sensor element 2 with respect to the axial direction X, and an outer cover 12 disposed outside the inner cover 11, with a space between the inner cover 11 and the outer cover 12. An inner side hole 11a and an inner tip face hole 11b, through which a gas to be measured flows, are provided in the side 111 and in the tip face 112 respectively of the inner cover 11. In addition, the outer cover 12 is provided with outer side holes 12a in the side 121, through which the gas to be measured flows, with the tip position of the outer side holes 12a being closer to the tip end than is the tip face 112 of the inner cover 11.

In the element cover 1, the flow path 3 provided between the outer side of the inner cover 11 and the inner side of the outer cover 12 has a large clearance section 31, constituting the maximum clearance amount, outside the periphery of the tip face 112 of the inner cover 11. The flow path 3 also has a small clearance section 32, constituting the minimum clearance amount, that is closer to the base end than is the large clearance section 31, and the flow path 3 is formed with a shape such that the large clearance part 31 and the small clearance part 32 are connected without a step. The configuration of the element cover 1 is described in detail hereinafter.

As shown in FIG. 3, the PM sensor S has the sensor element 2 contained coaxially within a cylindrical housing H, with the element cover 1 being attached such as to cover the tip end opening H1 of the housing H and protect the detection section 21 of the sensor element 2, which protrudes from the tip end opening H1. The PM sensor S is, for example, attached by being screwed into the exhaust pipe wall of the internal combustion engine E shown in FIG. 4, by means of a screw member H2 provided on the outer periphery of the housing H, with the tip end of the PM sensor S protruding into the exhaust gas passage EX.

Figure 4:
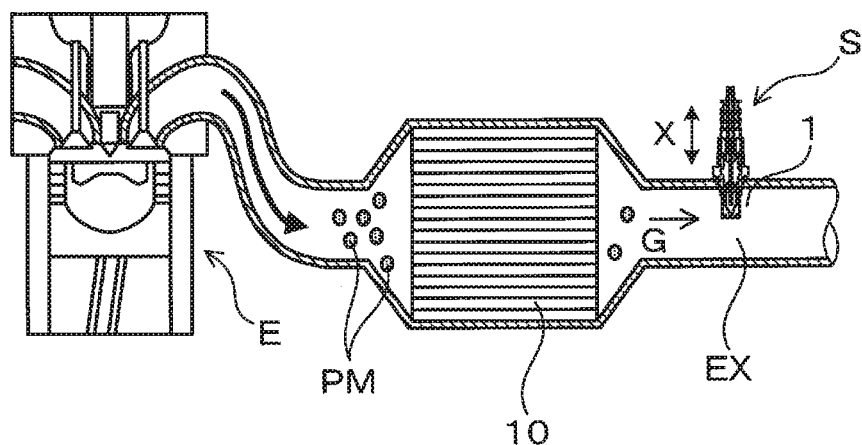
FIG. 4 is a general configuration diagram showing an example of an exhaust gas purification system that includes the PM sensor of the first embodiment.

As shown in FIG. 4, a diesel particulate filter (hereinafter referred to as DPF) 10 is installed at an intermediate position along the exhaust gas passage EX, and the PM sensor S is positioned downstream from the DPF 10, to detect particulate matter (that is, "PM" indicated in the diagram) contained in the exhaust gas G. The particulate matter that passes through the DPF 10 can thereby be detected, enabling a part of an abnormality diagnosis system for the DPF 10 to be configured, for example. At positions downstream from the DPF 10, the flow direction of the exhaust gas G is at right angles to the axial direction X of the PM sensor S.

As shown in FIG. 2, the sensor element 2 is a laminated element with a multi-layer structure, having an insulating substrate 22 shaped as a rectangular parallelepiped, with a detection section 21 on the tip surface thereof, and having electrodes 23 and 24 exposed. The insulating substrate 22 is formed, for example, by firing a laminate in which electrode films that are to constitute the electrodes 23 and 24 are arranged in alternation between a plurality of insulating sheets which will constitute the insulating substrate 22. At this time, edge portions of the electrodes 23 and 24, which are at least partially buried in the insulating substrate 22, are linearly exposed on the tip surface of the insulating substrate 22, and constitute a plurality of electrode pairs consisting of linear electrodes having alternately different polarities. Lead portions 23a and 24a connected to the electrodes 23 and 24 are disposed inside the insulating substrate 22, and are connected to terminal electrodes 25 and 26 formed at the base end of the insulating substrate 22.

The insulating substrate 22 may be formed, for example, using an insulating ceramic material such as alumina. In addition, the electrodes 23 and 24, the lead portions 23a and 24a, and the terminal electrodes 25 and 26 may be configured by using an electrically conductive material such as a noble metal, for example.

In FIGS. 1 and 3, the element cover 1 has a double-wall container form, with the housing H side open, and includes an inner cover 11 and an outer cover 12 which are disposed coaxially. The outer cover 12 has a side 121 consisting of a cylindrical body having a substantially constant diameter, and a tip face 122 which closes the cylindrical body, while the inner cover 11 has a side 111 consisting of a cylindrical body, and a tip face 112 which closes the cylindrical body, with a space formed between the inner cover 11 and the outer cover 12. The base end portion of the inner cover 11 has an enlarged diameter, is in close contact with the base end portion of the outer cover 12, and is integrally attached to the tip end of the housing H.

The cylindrical body that forms the side 111 of the inner cover 11 extends continuously from the tip face 112, and has a tapered first cylindrical portion 113 whose diameter increases toward the base end, and a second cylindrical portion 114 which has a substantially constant diameter and extends continuously from the first cylindrical portion 113 toward the base end. The first cylindrical portion 113 has a tapered surface with a fixed taper angle, and a large clearance section 31 is formed between the outer cover 12 and the first cylindrical portion 113 at the base end. A small clearance section 32 is formed between the second cylindrical portion 114 and the outer cover 12.

The large clearance section 31 is a portion where the clearance amount in a direction at right angles to the axial direction X, that is, the distance between the outer surface of the inner cover 11 and the inner surface of the outer cover 12, is a maximum. In the part of the flow path 3 that faces the first cylindrical portion 113, the smaller the distance to the base end, passing from the tip end, the smaller becomes the amount of clearance.

The small clearance section 32 is a portion in which the clearance amount in a direction at right angles to the axial direction X, that is, the distance between the outer surface of the inner cover 11 and the inner surface of the outer cover 12, is a minimum. In the part of the flow path 3 that faces the second cylindrical portion 114, the clearance amount is constant from the tip end to the base end, being the minimum value of the small clearance section 32.

A plurality of inner side holes 11a are provided in the second cylindrical portion 114 of the inner cover 11, at an intermediate position with respect to the axial direction X, that is, in a base end part of the side 111. A single inner tip face hole 11b is provided at the center of the tip face 112. The inner side holes 11a and the inner tip face hole 11b are, for example, circular through holes, and while the number and arrangement of the inner side holes 11a are not particularly limited, these holes are preferably arranged at equidistant spacings around the entire circumference of the inner cover 11.

A plurality of outer side holes 12a are provided in the side 121 of the outer cover 12, near the tip face 112 of the inner cover 11. The outer side holes 12a may be formed, for example, with a larger diameter than that of the inner tip face hole 11b. The outer side holes 12a are circular through holes that open into the space between the tip face 112 of the inner cover 11 and the tip face 122 of the outer cover 12, and are preferably arranged at equidistant spacings around the entire circumference of the outer cover 12. In that way, by providing the outer side holes 12a and the inner side holes 11a around the entire circumferences of the outer cover 12 and the inner cover 11 respectively as described above, a configuration is obtained which has no directivity with respect to gas flow, thereby facilitating mounting the sensor.

A plurality of drainage holes 13 are provided in an outer peripheral part of the tip face 122, which does not face the inner tip face holes 11b. The drainage holes 13 are small holes for discharging water that has condensed in the element cover 1, and are made sufficiently small in relation to the outer side holes 12a, through which the exhaust gas mainly flows.

Figure 5:
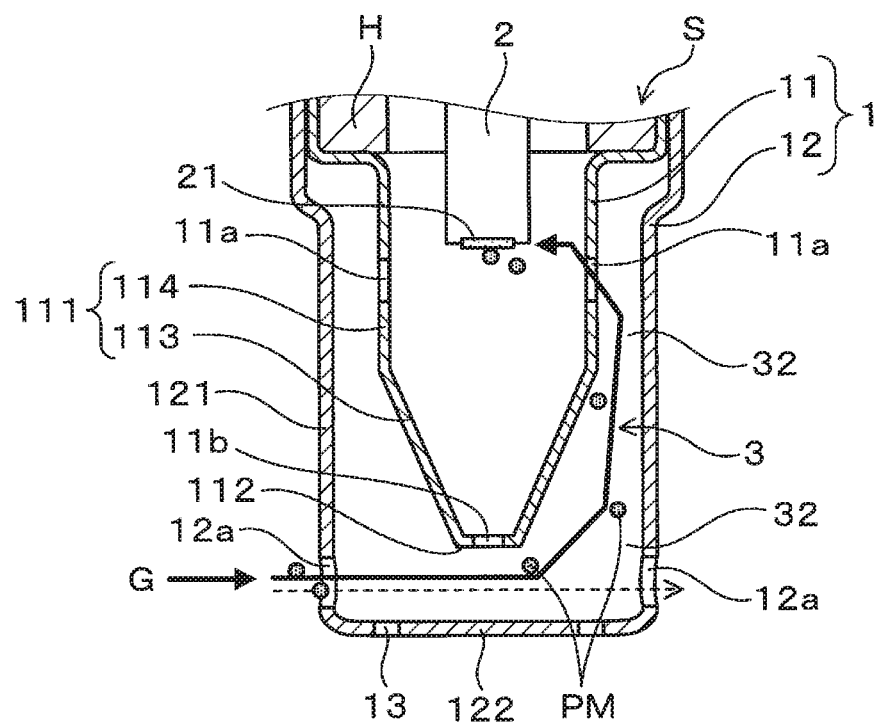
FIG. 5 is an enlarged cross-sectional view of a main part of the first embodiment, for describing the gas flow within the element cover of the PM sensor.

As shown in FIG. 5, exhaust gas G that flows from the side of the PM sensor S toward the element cover 1 is introduced through an outer side hole 12a that opens on the side 121 of the outer cover 12. Since the outer side holes 12a in the element cover 1 are located closer to the tip end of the element cover than is the tip end of the inner cover 11, the exhaust gas G flows directly through the space between the tip face 112 of the inner cover 11 and the tip face 122 of the outer cover 12, with sufficient flow velocity, toward an outer side hole 12a that is located facing the direction of flow of the exhaust gas G (for example, see the broken-line arrow in FIG. 5).

In addition, at the downstream end of the large clearance section 31, a part of the exhaust gas G changes its direction, flowing toward the base end, into a flow path 3 which is formed between the side 111 of the inner cover 11 and the side 121 of the outer cover 12 (for example, see the bold-line arrow in FIG. 5).

The flow passage 3 has a smaller flow passage area in the small clearance section 32 than in the large clearance section 31, which is on the inflow side, and hence the exhaust gas G increases in flow velocity due to the Venturi effect, as it flows toward the inner side holes 11a which open into the small clearance section 32. The first cylindrical portion 113 of the inner cover 11, which is closer to the tip end than the second cylindrical portion 114 that forms the small clearance section 32, has a tapered shape which becomes reduced in diameter toward the tip end, and this causes the flow passage area of the part of the flow path 3 between the large clearance section 31 and the small clearance section 32 to gradually become narrower. The exhaust gas G that flows along the side 111 of the inner cover 11 does not readily generate an eddy current.

Thus, the flow velocity of the exhaust gas G is further increased by the effect whereby eddy currents are suppressed, and so flows into the inner cover 11 from an inner side hole 11a at a sufficiently high flow velocity. The exhaust gas then reaches the detection section 21 at the tip end of the sensor element 2, located in the interior at the base end, maintaining a sufficiently high flow velocity. Such a flow of exhaust gas G increases the supply flow rate per unit of time to the detection section 21, enabling a reduction of the time required for detecting particulate matter, such as when failure of the DPF 10 occurs, and improves the detection sensitivity of the sensor element 2.

The exhaust gas G then flows toward the inner tip face hole 11b which opens in the tip face 112 of the inner cover 11 (for example, see the bold-line arrow in FIG. 1). At this time, as described above, the exhaust gas G has a sufficiently high flow velocity, in the space between the tip face of the inner cover 11 and the tip face 122 of the outer cover 12, to generate a negative pressure in the vicinity of the inner tip face hole 11b.

Figure 6:
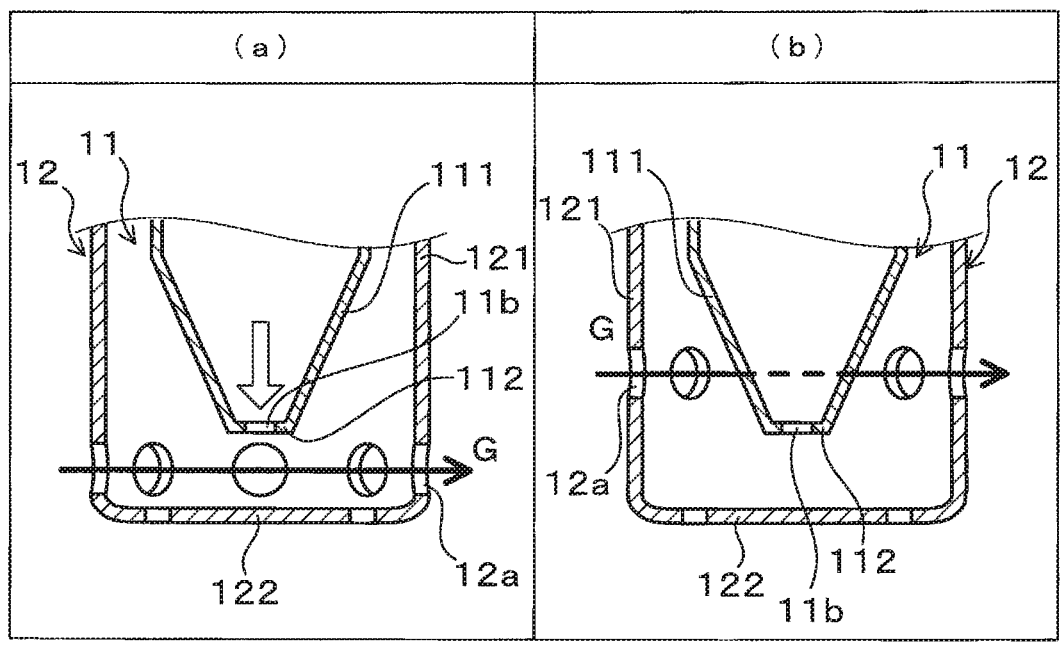
FIG. 6 shows enlarged cross-sectional views of a main part of the element cover of the PM sensor according to the first embodiment, for comparison between the effects of an arrangement (a) of the outer side holes in the element cover and the effects when changed to a different arrangement (b) of the outer side holes in the element cover.

That is, with the configuration of this embodiment as illustrated in the left-side diagram (a) of FIG. 6, a flow of gas from the inner tip face hole 11b into the outer cover 12 is produced, due to the suction effect of the negative pressure. For reference, with a configuration in which the outer side holes 12a are located closer to the base end than is the tip face 112 of the inner cover 11, as shown in the left-side diagram (b) of FIG. 6, no negative pressure is generated, since the gas does not flow below the inner tip face hole 11b, but passes around the periphery of the side 111 of the inner cover 11.

Since no hole serving as a gas flow hole is formed in the tip face 122 of the outer cover 12 of the present embodiment, and in particular is not formed at a position facing the inner tip face hole 11b, the flow direction of the exhaust gas G is at right angles to the axial direction X. The inner tip face hole 11b does not open in the flow direction of the exhaust gas G, and due to this and to the above-described suction effect, a flow of exhaust gas G is produced from the inner tip face hole 11b in a direction such as to merge with the flow of exhaust gas G, so that the exhaust gas G which flows into the outer cover 12 is prevented from flowing directly from the inner tip face hole 11b into the interior of the inner cover 11.

Hence even if water condensate is contained in the exhaust gas G and adheres to the interior of the outer cover 12, there is little possibility that the water condensate will enter the inner cover 11 together with the exhaust gas G and reach the sensor element 2. Thus, the problem of cracking caused by the sensor element 2 becoming wet can be suppressed With the configuration of the present embodiment as shown schematically in FIG. 7, it becomes possible to suppress the generation of eddy currents in the flow path 3 when the exhaust gas has a low flow velocity. That is, as the exhaust gas G which has passed into the outer cover 12 flows in the forward direction, a part of that gas flows smoothly into the large clearance section 31 just before passing out through an outer side hole 12a. As this flow rises along the flow path 3, the flow velocity increases in the vicinity of the small clearance section 32 at the base end, and that gas then flows into an inner side hole 11a and hence toward the tip end of the sensor element 2. In addition, a gas flow is formed which passes out of the inner cover 11 through the inner tip face hole 11b, and merges with the exhaust gas G that is flowing in the space between the two tip faces 112 and 122.

Figure 8:
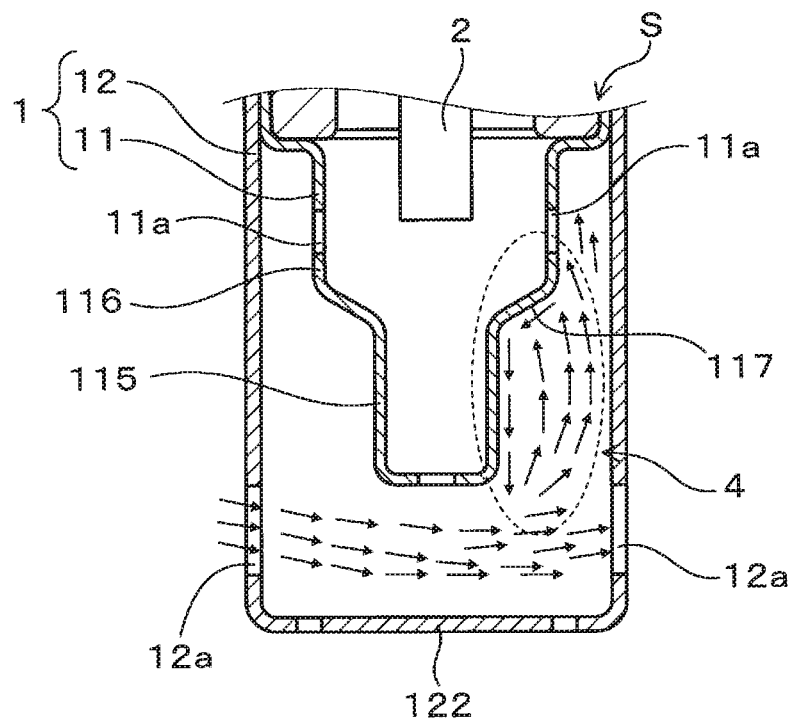
FIG. 8 is an enlarged cross-sectional view of a main part of a PM sensor schematically showing the result of CAE analysis of the gas flow inside a conventional element cover.

On the other hand in the comparison example of FIG. 8, a configuration is shown in which the tip-end half of the inner cover 11 is a small-diameter portion 115 having a fixed diameter, while a tapered step surface 117 is formed between the small-diameter portion 115 and a large-diameter base-end half 116 of the inner cover 11, and with that configuration the exhaust gas G that flows into the outer cover 12 will readily form a large eddy current in the outer peripheral space 4 at the tip-end half. That is, although the exhaust gas G flows into the outer peripheral space 4 just before flowing out from an outer side hole 12a, it is obstructed by the step surface 117, thereby forming an eddy current and so restraining the flow velocity from increasing. If as a result the gas does not flow into an inner side hole 11a at a sufficiently high flow velocity and cannot reach the tip face of the sensor element 2, the detection sensitivity of the detection section 21 becomes lowered.

Figure 7:
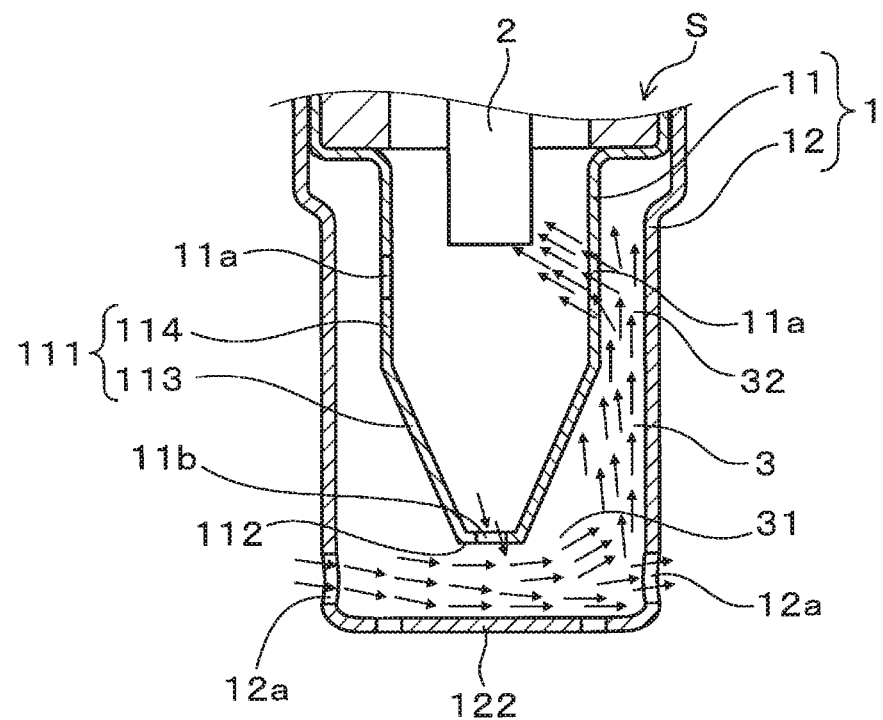
FIG. 7 is an enlarged cross-sectional view of a main part of the PM sensor schematically showing the result of CAE analysis of the gas flow inside the element cover of the first embodiment.

FIGS. 7 and 8 schematically illustrate gas flows within an element cover, based on results of CAE (Computer Aided Engineering) analysis for the case of a low flow velocity (for example 10 m/s).

In that way, with the configuration of the present embodiment, a favorable detection performance can be maintained even when the flow velocity is low, without the detection sensitivity of the PM sensor S being reduced.

(Test Example)

Figure 9:
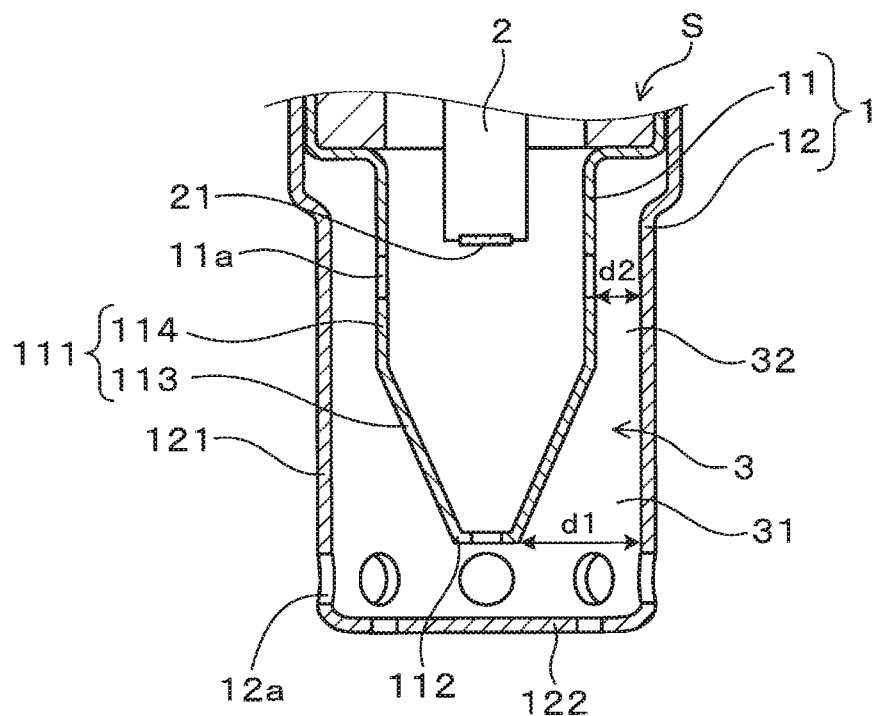
FIG. 9 is an enlarged cross-sectional view of a main part of a PM sensor, for describing a clearance ratio d1/d2 of the element cover of the first embodiment.

Next a description will be given, referring to FIGS. 9 to 12, of an evaluation test performed for examining the effects of the shape of the flow path 3, and the test results. As shown in FIG. 9, designating the clearance at the large clearance section 31 (that is, the maximum clearance amount) as d1 and the clearance at the small clearance section 32 (that is, the minimum clearance amount) as d2, element covers 1 were prepared in which the clearance ratio d1/d2 varied within the range of 1.5 to 20. Each of respective PM sensors S provided with an element cover 1 was attached to a PM model gas bench, a model gas having a predetermined PM concentration was introduced, and the rise time of the output from the detection section 21 of the sensor element 2 was evaluated. The test conditions were as follows, and the evaluation results are shown in FIG. 10.

Evaluation bench: PM model gas bench
Gas velocity: 10 m/s
PM concentration: 6 mg/m$^3$ As shown in the left-side diagram of FIG. 11, prior to the evaluation test, the detection section 21 was regenerated by heating the sensor element 2, to remove PM from the surface, and a predetermined collection voltage was then applied between the electrodes 23 and 24 to start electrostatic collection. The output rise time is the time interval that elapses until the output of the detection section 21 rises above a predetermined threshold value, when the electrodes 23 and 24 have been energized to collect particulate matter on the surface of the insulating substrate 22 by electrostatic force. As shown in the right-side diagram of FIG. 11, the detection characteristics of the PM sensor S are correlated with the flow velocity, and the detection time (that is, the rise time) decreases in accordance with increase of the flow velocity, however above a certain flow velocity the detection sensitivity becomes almost constant. This is due to the fact that, although an increase in the flow velocity will increase the rate at which particulate matter reaches the vicinity of the detection section 21, it can be considered that when the flow velocity exceeds a certain value it becomes difficult for particles to remain near the detection section 21, and hence the rate at which the particulate matter is collected will not readily increase.

Figure 10:
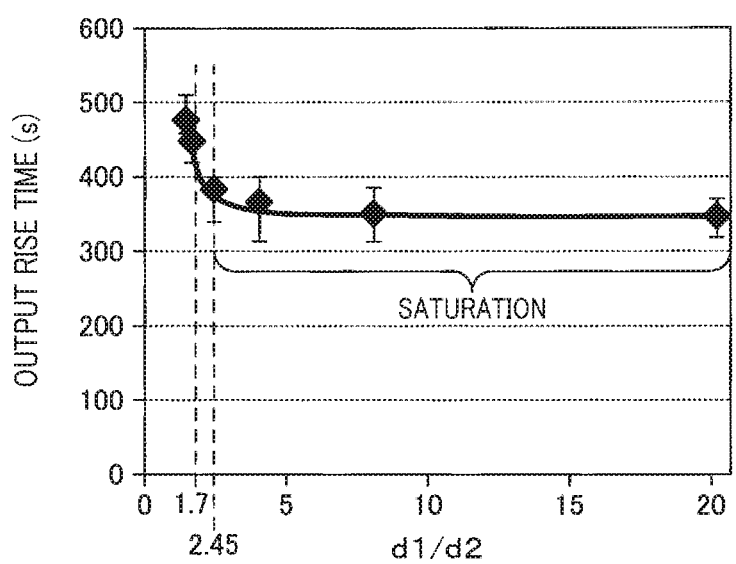
FIG. 10 is a diagram showing the relationship between the clearance ratio d1/d2 and an output rise time in an evaluation test.
Figure 11:
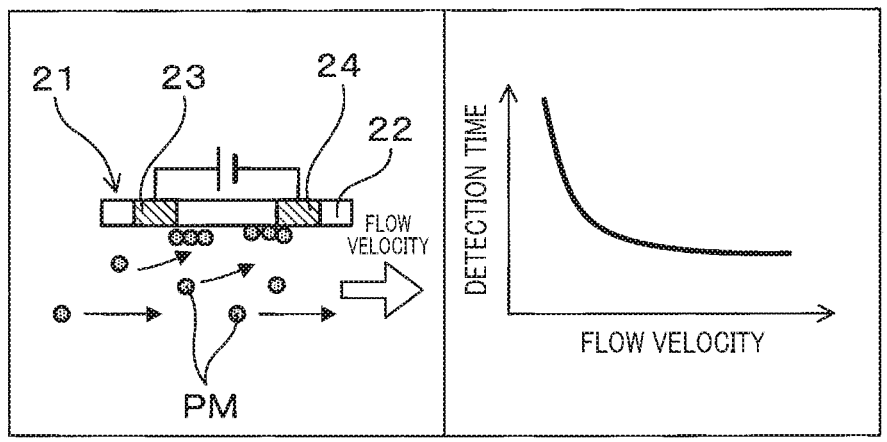
FIG. 11 shows a general configuration diagram of a detection section of the first embodiment, for describing the detection principles of the sensor element, and a diagram illustrating the relationship between flow velocity and detection time.
Figure 12:
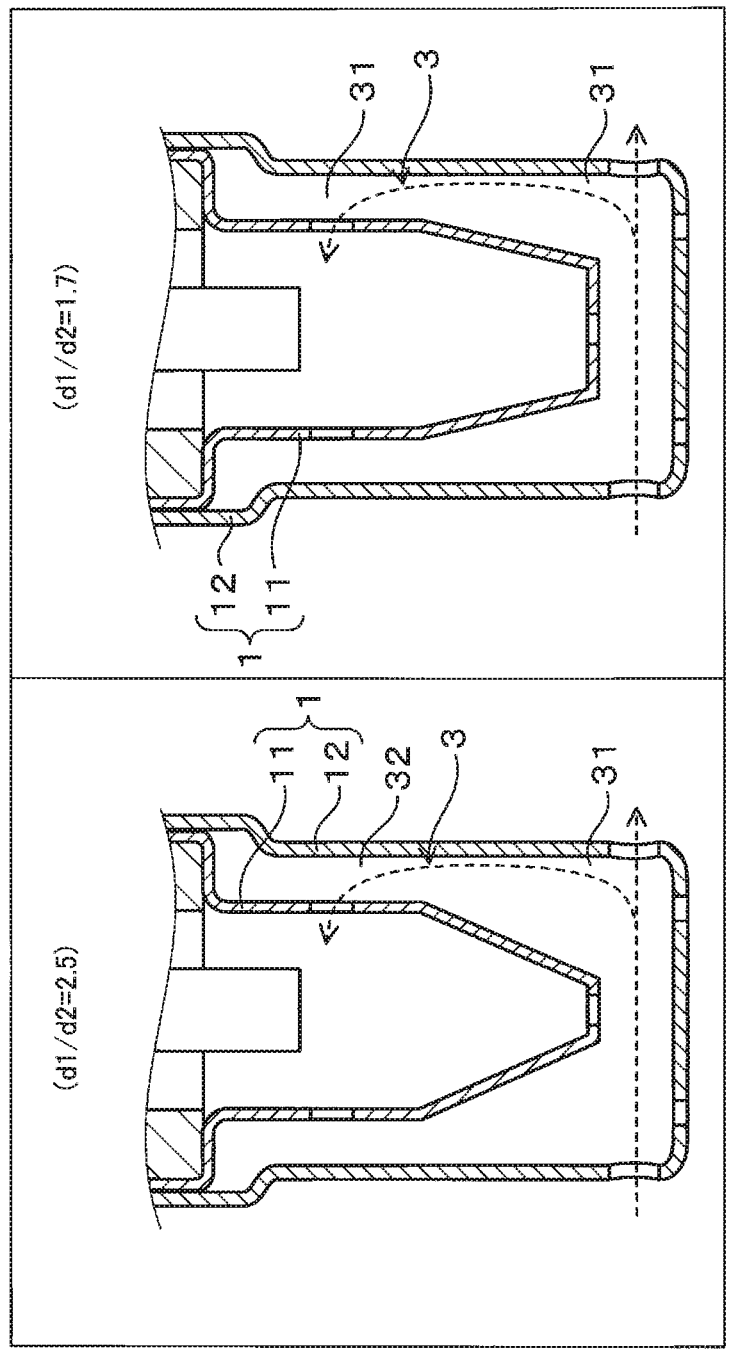
FIG. 12 shows enlarged cross-sectional views of a main part of the element cover of the PM sensor according to the first embodiment, for comparison between element cover shapes when the clearance ratio d1/d2=2.5 and when the clearance ratio d1/d2=1.7, respectively.

As shown in FIG. 10, when d1/d2 is varied within the range 1.5 to 20, the rise time of the output sharply decreases as d1/d2 increases, then converges to a substantially constant value when d1/d2 is within a range higher than 2.45 or more (that is, the range shown as "saturation" in the diagram). Specifically, with a configuration in which d1/d2=1.7 (for example, see the right-side diagram of FIG. 12), the rise time is reduced to about 450 seconds. Furthermore, with a configuration in which d1/d2=2.45 (for example, see the left-side diagram in FIG. 12), the rise time is less than 400 seconds, that is, the output rise time is reduced by about 100 seconds by comparison with a configuration in which d1/d2=1.5. When d1/d2=8, the rise time is reduced to about 350 seconds, and becomes substantially constant.

Hence it is preferable to use an element cover 1 having a clearance ratio d1/d2 of 2.45 or more, which will enable the detection sensitivity to be greatly improved. Even more preferably, an appropriate value of the clearance ratio d1/d2 can be selected within a range of values that are higher than 2.45.

Second Embodiment

Figure 13:
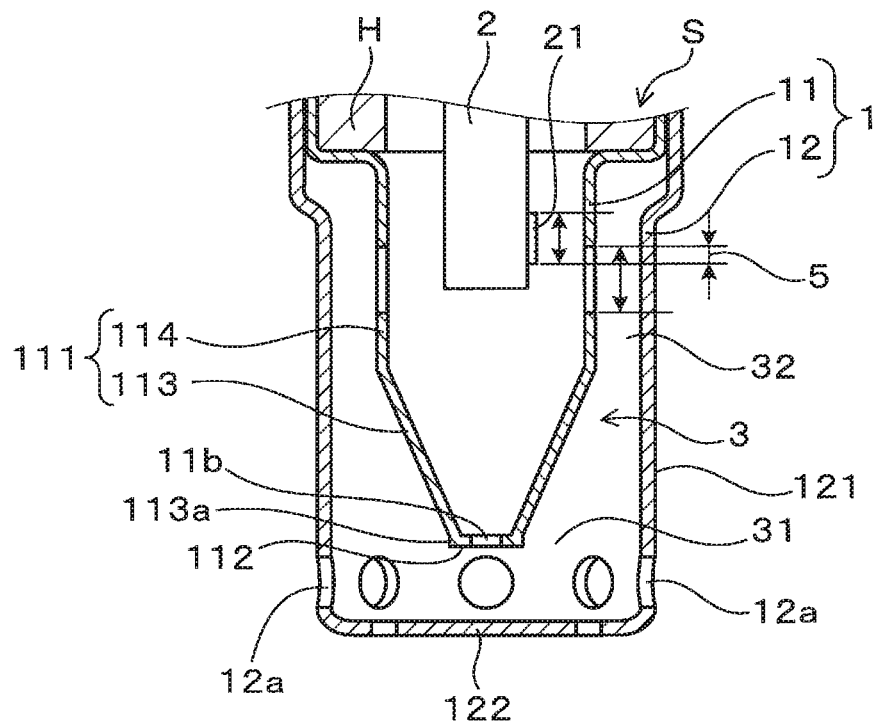
FIG. 13 is an enlarged cross-sectional view of a main part of a PM sensor according to a second embodiment.

A second embodiment of a PM sensor S as a sensor device will be described referring to FIGS. 13 and 14. In the first embodiment, the detection section 21 is provided on the tip face of the sensor element 2. However, as shown in FIG. 13, the detection section 21 may be provided on a side of the sensor element 2. The configuration of the PM sensor S, other than for the sensor element 2, is identical to that of the first embodiment, and hence the following description will focus on points of difference from the configuration of the first embodiment. Concerning the reference numerals used in the second and subsequent embodiments, it should be noted that reference numerals which are identical to those used in the above embodiment represent the same components etc., as those in the above embodiment, unless otherwise specified.

Figure 14:
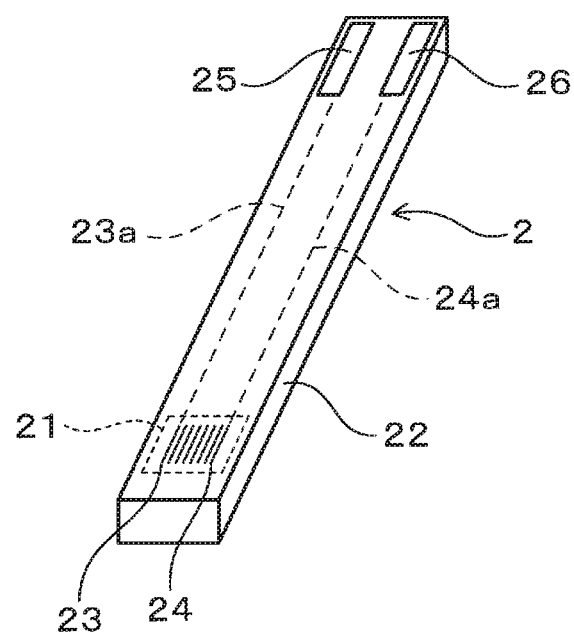
FIG. 14 is an overall perspective view of the sensor element of the PM sensor of the second embodiment.

In FIG. 14, the sensor element 2 is a laminated element having a multi-layer structure, and has a detection section 21 with electrodes 23 and 24 exposed on one side of an insulating substrate 22 that is shaped as a rectangular parallelepiped. The configuration whereby the electrodes 23 and 24 are connected to terminal electrodes 25 and 26 via lead portions 23a and 24a is the same as in the preceding embodiment.

In FIG. 13, the sensor element 2 is arranged such that the side having the detection section 21 faces an inner side hole 11a through which the exhaust gas G flows into the inner cover 11. In that condition, it is preferable that when the detection section 21 is projected onto the side 111 of the inner cover 11, at least a part of the projection surface overlaps the inner side hole 11a, with respect to the axial direction X. In other words, when both of the axial-direction ends of the detection section 21 are projected onto the side 111, at least a part of the inner side hole 11a should be located between these two ends.

In that way, the exhaust gas G that flows into the inner cover 11 through the inner side hole 11a can readily directly reach the detection section 21, positioned opposite, without diffusing. Hence, a good detection performance can be maintained even at a low flow velocity, without the detection sensitivity of the PM sensor S becoming lowered.

It is not essential for the first cylindrical portion 113 of the inner cover 11 to have a shape whereby the diameter gradually decreases from the large clearance section 31 on the tip end side to the small clearance section 32 on the base end side, that is, it is not necessary for the entire first cylindrical portion 113 to be tapered. For example, the shape may be such that a cylindrical portion 113a having a substantially constant diameter is provided at the tip end portion which forms the large clearance section 31.

With such a configuration too, eddy currents are effectively suppressed, as a result of the increased flow velocity of the exhaust gas G that passes through the flow passage 3 toward the small clearance section 32. Furthermore, since it is easy to set the clearance d1 of the large clearance section 31, which is the maximum clearance amount, the desired effect can readily be obtained by forming the flow path 3 to have a prescribed clearance ratio d1/d2.

Third Embodiment

Figure 15:
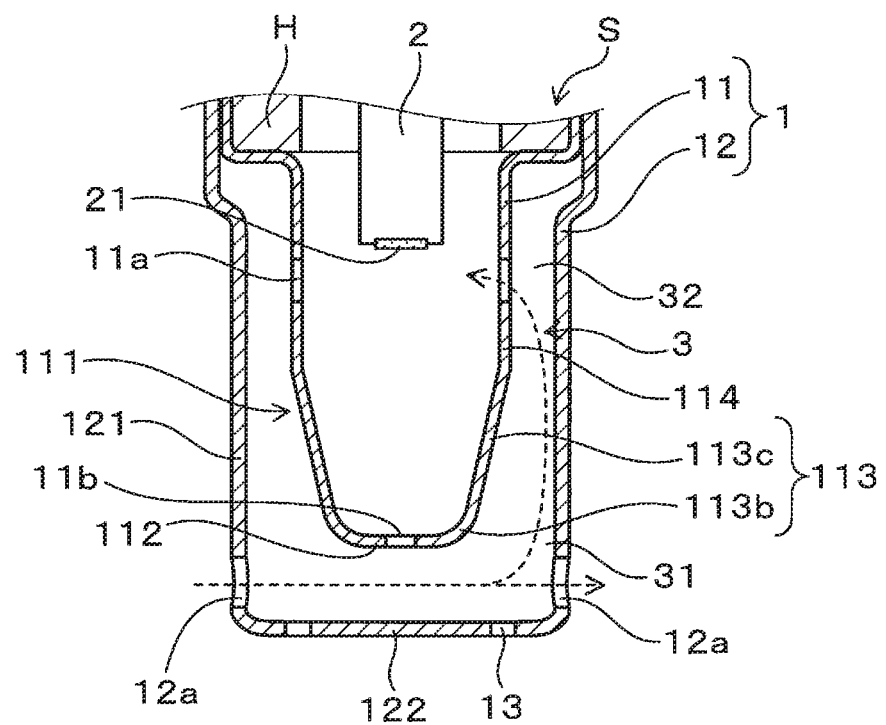
FIG. 15 is an enlarged cross-sectional view of a main part of a PM sensor according to a third embodiment.

A third embodiment of the PM sensor S as a sensor device will be described referring to FIG. 15. As described above, it is only necessary for the shape of the inner cover 11 to be such that the clearance of the flow path 3 becomes gradually reduced, with no step surface. In FIG. 15, the inner cover 11 includes a second cylindrical portion 114 having a substantially constant diameter, and a first cylindrical portion 113 provided at the tip end side of the second cylindrical portion 114. The first cylindrical portion 113 is formed with a substantially tapered shape as a whole, and consists of a tapered cylindrical portion 113c, whose diameter decreases from the base end side to the tip end, and a curved cylindrical end portion 113b, which connects the cylindrical portion 113c to the tip face 112 of the inner cover 11. The configuration of the PM sensor S, other than for the inner cover 11, is the same as in each of the above embodiments, so that further description is omitted.

With such a configuration, the tip face 112 and the side 111 of the inner cover 11 are smoothly connected by the cylindrical tip end portion 113b, so that exhaust gas which flows into element cover 1, passing from the tip face 112 to the tip end cylindrical portion 113, can flow smoothly along the cylindrical surface 113c into the flow path 3. This provides increased effectiveness in preventing a decrease in the flow velocity and in improving the detection sensitivity.

In the inner cover 11, it is not necessary for the tapered surface forming the first cylindrical portion 113 to have a constant taper angle, and for example it could have a shape in which a plurality of taper surfaces having respectively different taper angles are connected along the axial direction X.

As described above, the shape of the inner cover 11 or of the outer cover 12 forming the flow path 3 may be changed appropriately, so long as the change is within a range whereby the effect of increasing the flow velocity of the exhaust gas G is obtained and the gas flow is not significantly affected.

In each of the above embodiments, a PM sensor S having a laminated sensor element 2 has been described as an example, however, it would be equally possible for the sensor element 2 to be a printed type of element, in which the electrodes 23 and 24 are formed by printing on a surface that serves as the detection section 21. In that case, the electrodes 23 and 24 would be printed in a comb shape on the surface of an insulating substrate 22 having a flat plate shape, and connected to the terminal electrodes 25 and 26 via lead portions 23a and 24a similarly formed by printing on the surface of the insulating substrate 22.

Each of the above embodiments has been mainly described for the case in which the sensor device is a PM sensor S, however, the sensor device is not limited to being a PM sensor, and it would be equally possible for it to be a gas sensor that detects a specific gaseous component contained in the exhaust gas G. Specific examples of this are exhaust gas sensors such as an oxygen sensor that detects oxygen in the exhaust gas G, an air-fuel ratio sensor that detects the air-fuel ratio, and a NOx sensor that detects NOx. The sensor element 2 used for these gas sensors can have a known configuration, and for example, may have a configuration in which a detection section 21 having detection electrodes is provided at the tip end of a cup-type or multi-layer type of element.

In that case also, as with the above-described embodiments, the sensor element may be inserted and retained within the housing H such that the detection section 21 is located at the tip end, with respect to the axial direction X, protected by the element cover 1. The exhaust gas G that is introduced into the interior of the element cover 1 can then be guided to the flow path 3 between the inner cover 11 and the outer cover 12, increased in flow velocity as the gas passes from the large clearance section 31 to the small clearance section 32, and then guided to the detection section 21, thereby improving the output response of the detection section 21 of the sensor element 2.

In that way a gas sensor can be provided which exhibits a good detection performance even under operating conditions in which the exhaust gas G has a low flow velocity. By ascertaining the condition of the internal combustion engine based on the detection results from the gas sensor, and controlling the exhaust gas purification system accordingly, the exhaust gas purification performance can be improved.

The present disclosure is not limited to the above embodiments, and may be applied to various embodiments without departing from the gist of the disclosure. For example, each of the above embodiments has been described for the case in which a sensor device is applied to an exhaust gas purification system of an automobile engine. However, the invention is not limited in application to the internal combustion engine of an automobile, and may be used to measure the exhaust gas from various types of device. Furthermore, the gas to be measured is not limited to being the exhaust gas from an internal combustion engine, and the invention may be applied to sensor devices for detecting specific components contained in various gases.

(Conclusion)

The present disclosure has been achieved in light of the above-described circumstances. For a sensor element that is housed within an element cover having a dual-cover configuration, to increase the rate of gas flow toward the detection section of the sensor element by suppressing the generation of eddy currents in the element cover, the present disclosure provides a sensor device having a detection section which has an improved performance in detecting a specific component.

According to one aspect, the present disclosure provides a sensor device including a sensor element having a detection section for detecting a specific component in a gas under measurement, a housing having the sensor element inserted into the interior thereof, held with the detection section positioned at the tip end of the sensor element with respect to the axial direction and, an element cover at the tip end of the housing. The element cover includes an inner cover disposed such as to cover the tip end of the sensor element, and an outer cover disposed with a space between it and the outer periphery of the inner cover.

The inner cover has a side with an inner side hole provided therein and a tip face with an inner tip face hole provided therein, through which the gas under measurement flows. The outer cover is provided with outer side holes in a side thereof, through which the gas under measurement flows, with the tip position of the outer side holes being located closer to the tip end than is the tip position of the inner cover. A flow path provided between the outer surface of the inner cover and the inner surface of the outer cover has a large clearance section, which constitutes a maximum clearance amount, outside the tip end of the inner cover, and a small clearance section, which constitutes a minimum clearance amount, with the small clearance section being located closer to the base end than is the large clearance section and with the shape of the flow path being such that the large clearance section and the small clearance section are connected without a step.

With a sensor device having the above-described configuration, the gas to be measured flows into the interior of the element cover from an outer side hole of the outer cover, and passes through the space at the tip end of the inner cover toward an outer side hole that is positioned facing the flow direction of the gas, with a part of that gas flow passing into a flow path between the sides of the outer cover and the inner cover. That flow path is shaped such that there is no step, thereby preventing a decrease in flow velocity due to the generation of eddy currents, and furthermore the flow velocity is increased by a successive reduction of the cross-sectional area of the flow path, from the clearance amount in the large clearance section at the tip end to the clearance amount in the small clearance section at the base end.

Since the gas to be measured is introduced from an inner side hole to the detection section at an increased flow velocity, the supply flow rate to the detection section can be increased, and hence the detection sensitivity and output response can be improved. In addition, since no gas flow hole is required in the tip face of the outer cover, the gas to be measured is prevented from flowing directly into the inner tip face hole of the inner cover, so that water cracking of the sensor element can be prevented.

As described above, according to the above aspect, with a configuration in which a sensor element is housed in an element cover having a double-container structure, generation of eddy currents within the element cover is suppressed, and the velocity of the gas flow toward the detection section of the sensor element is increased, thereby making it possible to provide a sensor device having a detection section with improved performance in detecting a specific component.

What is claimed is:

1. A sensor device comprising:
    a sensor element provided with a detection section for detecting a specific component in a gas that is under measurement;
    a housing having the sensor element inserted into an interior thereof such that the detection section is positioned at the tip end of the sensor element with respect to an axial direction; and
    an element cover disposed at the tip end of the housing, wherein
        the element cover comprising an inner cover disposed to cover the tip end of the sensor element and an outer cover disposed with a space between it and an outer periphery of the inner cover;
        the inner cover has a side and a tip face having inner side holes and an inner tip face hole respectively provided therein, through which the gas under measurement flows;
        the outer cover is provided with outer side holes in a side, through which the gas under measurement flow, and the tip position of the outer side holes is closer to the tip end than is the tip position of the inner cover;
        a flow path that is provided between the outer surface of the inner cover and the inner surface of the outer cover has a large clearance section, having a maximum clearance amount, at the outside of the tip end of the inner cover, and a small clearance section, having a minimum clearance amount, that is closer to the base end than is the large clearance section, with the flow path having a shape whereby the large clearance section and the small clearance section are connected without a step, at a position that is closer to the tip end than is the tip of the sensor element, and, designating he clearance amount of the large clearance section in a direction at right angles to the axial direction as d1 and designating the clearance amount of the small clearance section in a direction a right angles to the axial direction as d2, the clearance ration d1/d2 is greater than 2.45; and
    wherein the base position of the outer side holes in the outer cover is identical to the tip position of the inner cover or is closer to the tip end than is the tip position of the inner cover, and wherein the tip face of the outer cover has no gas flow hole that is positioned facing the inner tip face hole with respect to the axial direction.

2. The sensor device according to claim 1, wherein the inner side holes provided in the side of the inner cover face the small clearance section.

3. The sensor device according to claim 1, wherein the detection section is disposed on the tip face of the sensor element.

4. The sensor device according to claim 1, wherein the detection section is disposed on a side of the sensor element, at the tip end thereof, and wherein a projection of the detection section on the side of the inner cover overlaps the inner side holes, with respect to the axial direction.

5. The sensor device according to claim 1, wherein the side of the inner cover has a first cylindrical section which expands in diameter from the tip end to the base end, and a second cylindrical section that is connected to the base end of the first cylindrical section and that has a constant diameter.

6. The sensor device according to claim 1, wherein the gas under measurement is exhaust gas of an internal combustion engine, and wherein the specific component is particulate matter or is a specific gaseous component.

7. The sensor device according to claim 1, wherein
a plurality of holes are provided in an outer peripheral part of the tip face of the outer cover, which does not face the inner tip face hole such that none of the plurality of holes are co-axial with the inner tip face hole.

8. The sensor device according to claim 7, wherein
each of the plurality of holes provided in the outer peripheral part of the tip face of the outer cover is smaller than the outer side holes.

9. The sensor device according to claim 7, wherein
each of the plurality of holes provided in the outer peripheral part of the tip face of the outer cover is smaller than the inner tip face hole.

10. The sensor device according to claim 1, wherein
each of the outer side holes is larger than the inner tip face hole.

* * * * *